United States Patent
Hollatz

(10) Patent No.: US 8,876,927 B2
(45) Date of Patent: Nov. 4, 2014

(54) RADIATOR SCREENS

(75) Inventor: Brian Jay Hollatz, Bassano del Grappa (IT)

(73) Assignee: AGCO do Brasil Comercio a Industria Ltd, Canoas (BR)

(*) Notice: Subject to any disclaimer, the term of this patent is extended or adjusted under 35 U.S.C. 154(b) by 0 days.

(21) Appl. No.: 13/979,020

(22) PCT Filed: Dec. 12, 2011

(86) PCT No.: PCT/IB2011/002997
§ 371 (c)(1),
(2), (4) Date: Jan. 16, 2014

(87) PCT Pub. No.: WO2012/095689
PCT Pub. Date: Jul. 19, 2012

(65) Prior Publication Data
US 2014/0123609 A1    May 8, 2014

(30) Foreign Application Priority Data
Jan. 12, 2011   (GB) .................................. 1100440.5

(51) Int. Cl.
*B01D 46/00* (2006.01)
*B60K 11/04* (2006.01)
*F01P 11/12* (2006.01)
*B60K 11/08* (2006.01)
*F01P 11/10* (2006.01)
*F02M 35/10* (2006.01)

(52) U.S. Cl.
CPC ............ *F01P 11/12* (2013.01); *B60Y 2200/41* (2013.01); *B60Y 2200/22* (2013.01); *B60K 11/04* (2013.01); *F02M 35/10013* (2013.01); *B60K 11/08* (2013.01); *F01P 11/10* (2013.01)

USPC ................... 55/286; 55/287; 55/289; 460/98; 460/102

(58) Field of Classification Search
USPC ........... 55/283, 289, 291, 293, 294, 296, 302, 55/385.1, 385.3; 95/20, 24; 96/425; 460/97, 98, 102
See application file for complete search history.

(56) References Cited

U.S. PATENT DOCUMENTS 3,155,473 A    11/1964  Hector
4,299,603 A    11/1981  Friesen
(Continued)

OTHER PUBLICATIONS

UK Search Report for UK application No. GB1100440.5 Dated May 11, 2011.
(Continued)

*Primary Examiner* — Duane Smith
*Assistant Examiner* — Minh-Chau Pham

(57) ABSTRACT

A radiator screen arrangement (10) for a combine harvester is provided. A screen (12) through which air, which is to pass through a radiator, is drawn by a fan. Rotating means (16) are provided for rotating the screen. Blanking means (18), past which the screen is rotated, provides a blanked off area of the screen which is not subject to the induction pressure of the fan and from which particles can therefore be more easily removed. The arrangement is characterised in that the blanking means has a leading edge (18a) which is of generally spiral shape so that the particles on the outer surface of the screen which enter the blanked-off area can reach the outer periphery (12d) of the rotating screen without being exposed to the induction pressure of the fan and hence have an improved chance of being detached from the screen.

8 Claims, 4 Drawing Sheets

(56) References Cited

U.S. PATENT DOCUMENTS

| | | | |
|---|---|---|---|
| 4,439,218 A * | 3/1984 | Priepke et al. | 55/288 |
| 4,874,411 A | 10/1989 | Snauwaert et al. | |
| 5,466,189 A * | 11/1995 | Deutsch et al. | 460/100 |
| 5,944,603 A | 8/1999 | Guinn et al. | |
| 6,248,145 B1 * | 6/2001 | Radke | 55/295 |
| 7,998,245 B2 * | 8/2011 | Demonie et al. | 95/20 |
| 2002/0088208 A1 * | 7/2002 | Lukac et al. | 55/289 |
| 2004/0003578 A1 * | 1/2004 | Twiefel | 55/289 |
| 2006/0283157 A1 * | 12/2006 | Keys et al. | 55/290 |
| 2007/0022720 A1 * | 2/2007 | Guertin | 55/289 |
| 2009/0211208 A1 * | 8/2009 | Johnson et al. | 55/291 |
| 2009/0312079 A1 | 12/2009 | Good | |

OTHER PUBLICATIONS

International Search Report for PCT/IB2011/002997 dated Jul. 17, 2012.

* cited by examiner

RADIATOR SCREENS

CROSS-REFERENCE TO RELATED APPLICATION

The present application claims the benefit of and priority from United Kingdom Application No. 1100440.5, filed Jan. 12, 2011, the entire disclosure of which is hereby incorporated by reference.

FIELD OF THE INVENTION

This invention relates to radiator arrangements for engine cooling in which a cooling fan draws air through a radiator matrix in order to cool water or other fluids flowing through the radiator.

BACKGROUND

In certain applications such as combine harvesters and agricultural tractors or similar vehicles which are forced to operate in dusty conditions, the matrix of the radiator is particularly liable to be blocked.

It is known to have a rotating radiator screen through which the air which is to pass through the air radiator is first drawn. Such screens often have brushes or similar devices which contact the screen to wipe off debris from the screen as the screen is rotated by a belt drive arrangement or a propeller connected with the screen which is rotated by air drawn in by the radiator cooling fan.

It is also known to blank off part of such a rotating screen, for example with a fixed sector shaped plate located inside the rotating screen, to create a sector shaped dead zone of the screen which is not subjected to the induction pressure of the associated radiator fan and to try to remove debris from the outside of this constantly changing blanked off dead zone of the screen using gravity, brushes or other devices including applying suction to the screen using a vacuum device.

While such prior art arrangements have been found to give limited improvements they also can significantly restrict the flow of air through the radiator (due to the size of the blanked off area of the screen) thus effecting the performance of the associated engine.

SUMMARY OF INVENTION

It is an object of the present invention to provide and improved form of radiator screen arrangement which at least mitigates the above problem.

Thus according to the present invention there is provided a radiator screen arrangement comprising a screen through which air, which is to pass through a radiator, is drawn by a fan, rotating means for rotating the screen, and blanking means which extends generally radially outwardly relative to the axis of rotation of the screen past which the screen is rotated and which provides a blanked off area of screen which is not subject to the induction pressure of the fan and from which particles can therefore be more easily removed, the arrangement being characterised in that the blanking means has a leading edge which is of generally spiral shape so that the particles on the outer surface of the screen which enter the blanked off area can reach the outer periphery of the rotating screen without being exposed to the induction pressure of the fan and hence have an improved chance of being detached from the screen.

The use of a spiral leading edge to the blanking means that the dead zone formed by the blanked off area is effectively much longer with respect to the direction in which material will travel as it moves over the outer surface of the dead zone of the screen towards the outer periphery of the rotating screen whilst allowing the use of a smaller area blanking means.

The blanking means preferably comprises a plate with a leading edge of generally spiral shape which is supported on the inside of the rotating screen.

Preferably the leading edge is of a "constant angle spiral" shape. This means that the tangent to the spiral is always at a constant angle to the radius of a circle passing through the centre of the spiral. Such spirals are also known as "logarithmic spirals" because their polar equation is logarithmic. The equation that defines this spiral is generally of the form $r=Ae^{(\theta \cot \alpha)}$ where $\theta$ is the angular position of the spiral $\alpha$ is the angle from the radius of the spiral to the tangent of the spiral.

The plate may be provided with brushes or seals or so-called "stripper plates" along its edges which tend to seal the plate to the rotating screen to provide a reduced induction pressure on that portion of the screen currently above the plate as the screen is rotated past the fixed plate.

The plate may also have a trailing edge of generally spiral shape (again a constant angle spiral) in order to minimise the area of the screen which is blanked-off. This significantly improves the cooling and hence the performance of the associated engine.

An escape shute may be provided which partially overlies the blanking plate on the outside of the rotating screen for material which passes over the outer periphery of the blanked-off area to direct this material away from the screen.

The blanked-off area may be connected to a vacuum device to assist in the removal of the material from the screen.

In an alternative arrangement the outer surface of the screen may be provided with generally radially extending ribs which contact material detached from the outer surface of the rotating screen and tend to move such material towards the outer periphery of the screen. These radially extending ribs may also be of constant angle spiral configuration.

BRIEF DESCRIPTION OF THE DRAWINGS

The present invention will now be described, by way of example only, with reference to the accompanying drawings in which.

DESCRIPTION OF EXAMPLE EMBODIMENT

Figure 1:
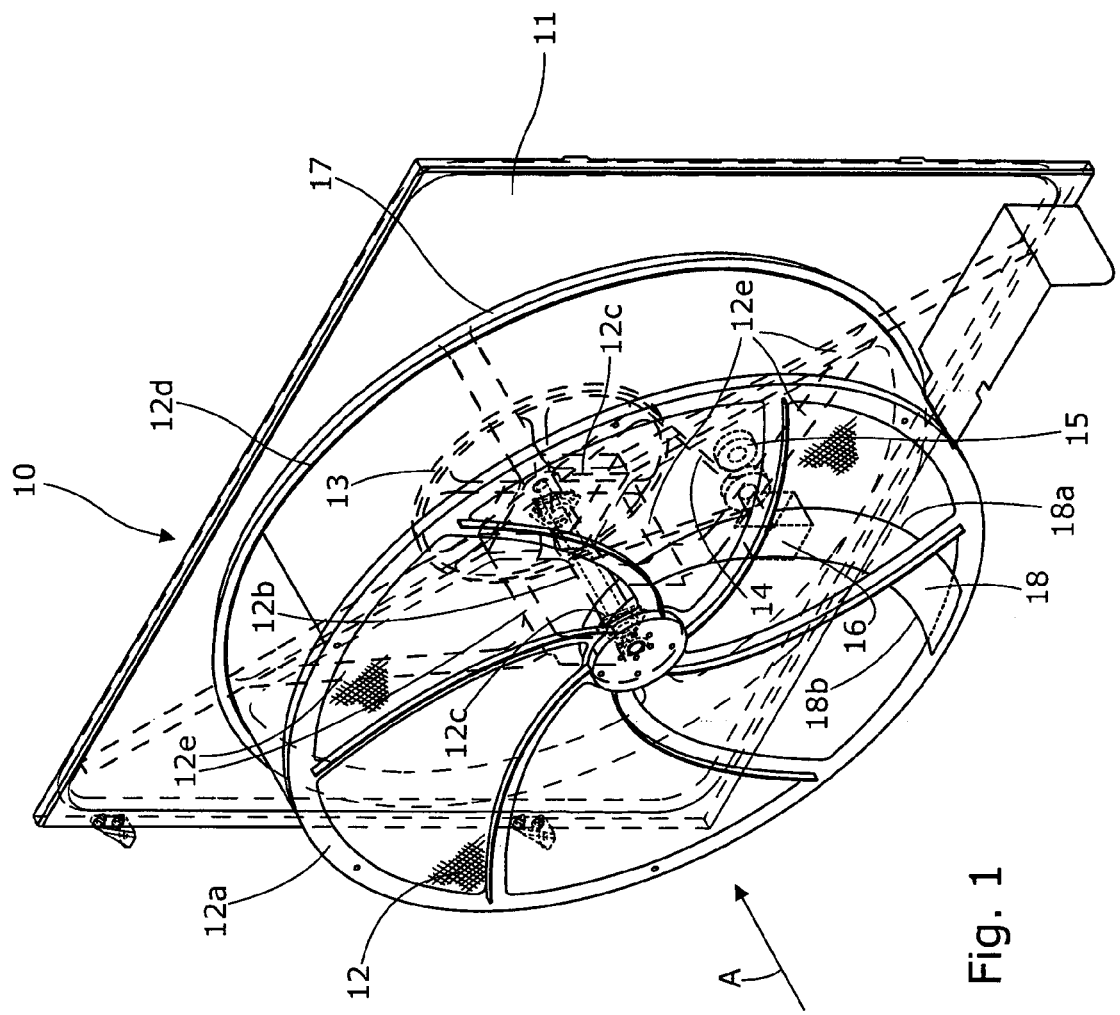
FIG. 1 is a perspective view of a radiator screen arrangement in accordance with the present invention.

Referring to the drawings, a radiator screen arrangement 10 has a bulkhead 11 which supports a rotating mesh screen 12 carried by a rotating cylindrical frame 12*a* mounted on shaft 12*b* carried by a bearing supports 12*c* mounted from bulkhead 10 on a support spider 12*e*. The edge 12*d* of the mesh screen 12 runs in a sealing channel 17 on bulkhead 11. The screen 12 is rotated relative to the bulkhead 10 by a hydraulic motor 16 which drives a pulley 13 connected with shaft 12*b* via a drive belt 14 which encircles the pulley and is maintained in driving contact with the pulley by a tensioning roller 15. Such rotating screen arrangements are well known and are used to filter the air which is drawn towards an associated engine cooling radiator (not shown) in the general direction A indicated in FIGS. 1 and 2 by a radiator fan (not shown).

As an alternative to the hydraulic motor and belt drive described above, the screen may be driven by a propeller, mounted within the screen, which is connected with the screen and powered by the air which is drawn through the screen by the radiator fan.

In accordance with the present invention a blanking plate 18 is supported from the spider 12e on the inside of the mesh screen 12 and has brush elements 19 located along its leading and trailing edges 18a and 18b respectively. These brush elements contact the inner surface of the screen as the screen is rotated to create a dead zone on the outside of the screen above the blanking plate 18 which is not subject to the air pressure generated by the radiator fan.

As an alternative to the brushes 19 rubber seals may be used or so-called stripper plates which are thin metal strips whose position relative to the inside of the screen 12 are adjustable.

The screen rotates in the direction of the arrow R and the leading edge 18a of blanking plate 18 is curved and of a generally constant angle spiral shape. This means that the tangent to the spiral is always at a constant angle to the radius of a circle passing through the centre of the spiral. Such spirals are also known as "logarithmic spirals" because their polar equation is logarithmic. The equation that defines this spiral is generally of the form $r=Ae^{(\theta \cot\alpha)}$ where $\theta$ is the angular position of the spiral $\alpha$ is the angle from the radius of the spiral to the tangent of the spiral.

By shaping the leading edge of plate 18 in this manner the time period during which particles on the outer surface of the mesh screen 12 are above the blanking plate (and therefore in the dead zone not subject to the suction effect of the associated cooling fan) is maximised. For example, a particle encountering the leading edge at position P1 will typically move along the path P1R as the screen rotates under the effect of centrifugal forces and will reach the outer periphery of the mesh screen 12 at say location P1' before it encounters the trailing edge 18b of the blanking plate.

Figure 2:
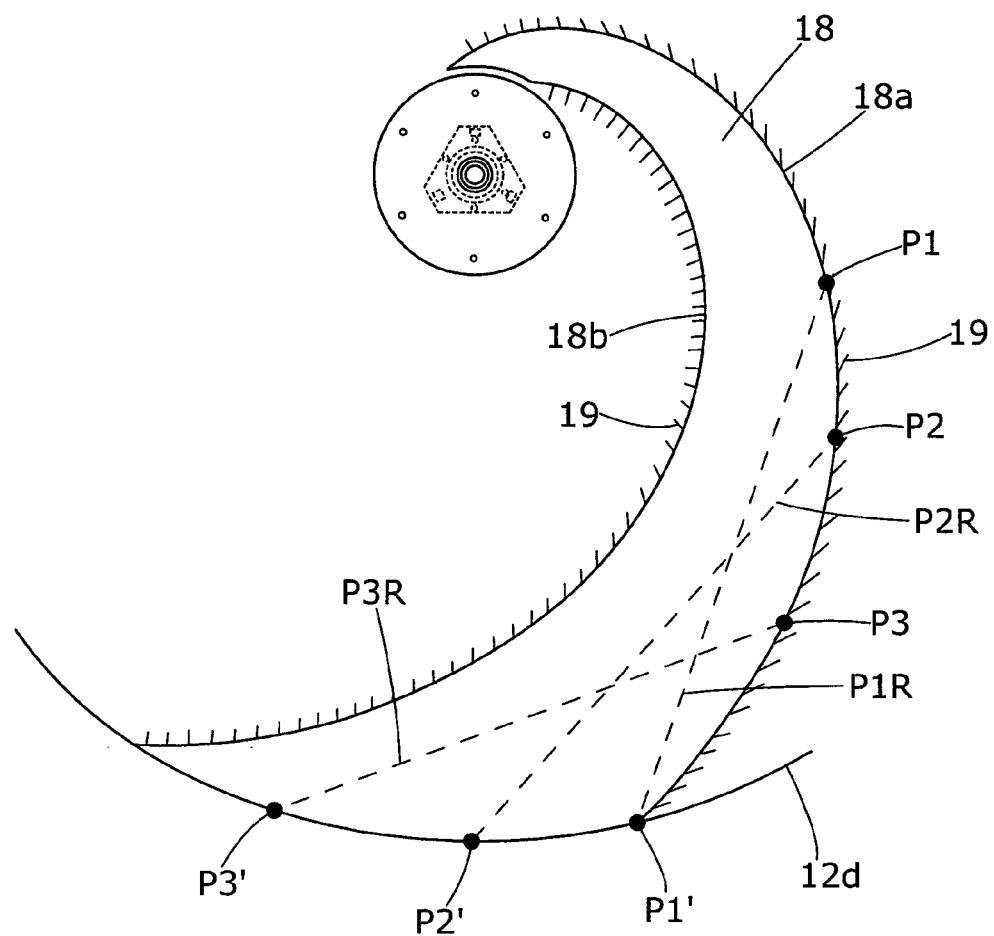
FIG. 2 is a diagrammatic representation of a screen blanking plate used in the arrangement of FIG. 1.

FIG. 2 shows similar paths P2R, P3R etc for particles contacting the leading edge 18a and positions P2,P3 etc and will be seen that by shaping the blanking plate 18 in this spiral form is possible for most particles to reach the outer periphery of the screen before they pass over the trailing edge of 18b of the blanking plate 18. By also shaping the trailing edge 18b in a spiral manner the area of the blanking plate 18 can be minimised without significantly effecting its efficiency thus significantly reducing the effect of the blanking plate on the cooling capacity of the fan.

The path of material entering the dead zone is such that after material enters the dead zone, it always stays closer to the leading edge 18a of the blanking means than the trailing edge 18b. That means that if the material falls off the outer surface of the screen and is picked up by the air stream again, it does not tend to move across the dead zone and back onto the un blanked off portion of the screen where it is rotated all the way around the screen but instead jumps back onto the screen adjacent the leading edge 18a of the blanking means. Each of these "jumps" brings the material closer to the outer periphery of the screen so that the material can "walk" along the leading edge 18a all the way to the outer periphery scarcely entering into the dead zone. This "jumping" phenomenon may allow the dead zone to be made very narrow, possibly allowing reductions in the area of the dead zone by as much as 80% from current sector shaped designs.

With the blanking plate shape of the present invention most of the particles which pass over the blanking plate have a significantly improved chance of reaching the outer periphery of the screen (from which they can then fall) before they reach the trailing edge 18b of the blanking plate 18 and are then again subject to the full suction effect of the cooling fan.

Figure 3:
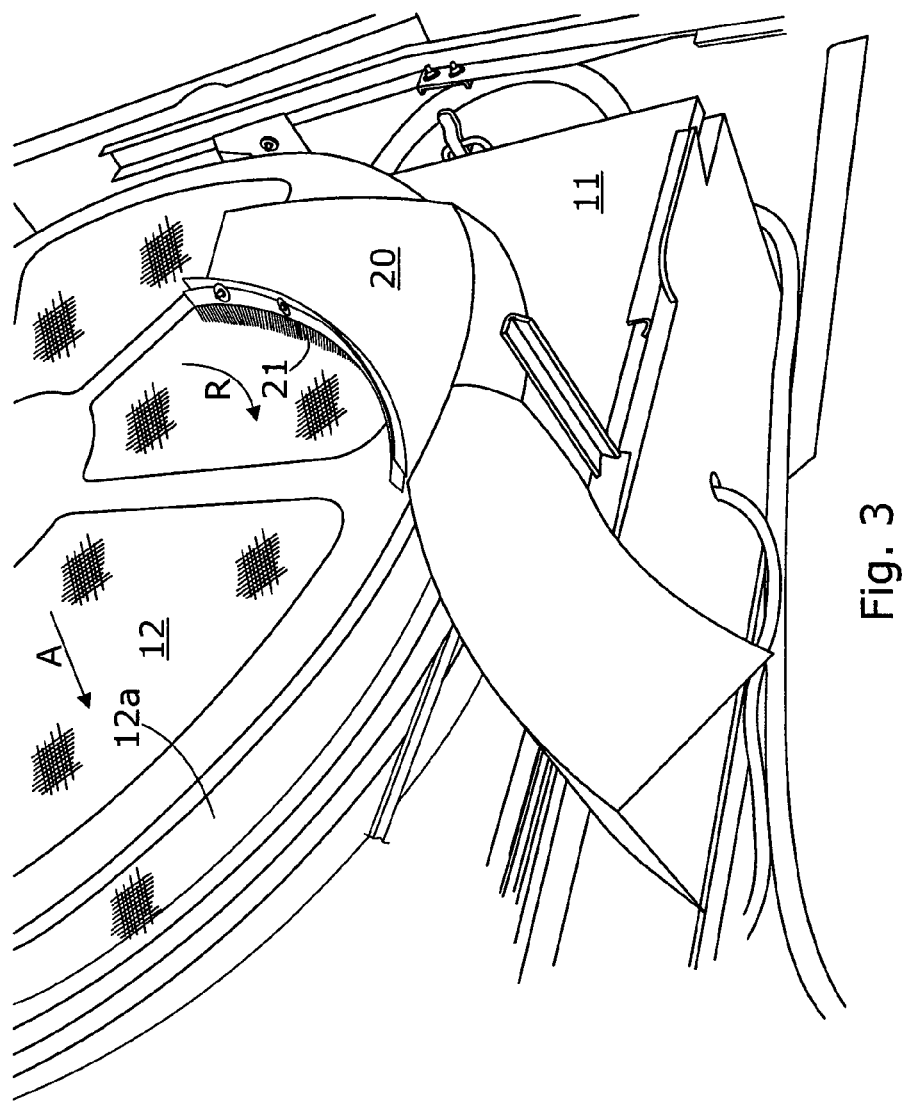
FIG. 3 shows a view of an optional escape shute for separated material which may overlie part of the screen arrangement shown in FIG. 1.

An optional escape shute 20 which may overlie part of the blanking plate 18 (see FIG. 3) and which directs the material which reaches the outer periphery of the rotating screen well away from the outer surface of the screen (see arrow B) so that the material cannot again be sucked on to the outer surface of the screen by the suction fan after it leaves the blanking plate 18. The shute has a brush 21 along its trailing edge 18b to further assist in dislodging material from the screen in the vicinity of the trailing edge 18b of the blanking plate and also to isolated the material near the trailing edge 18b from the effects of the airstream A.

Removal of material from the outer surface of screen 12 may be assisted by providing the escape shute 20 with a connection to a vacuum suction device to remove the material.

Figure 4:
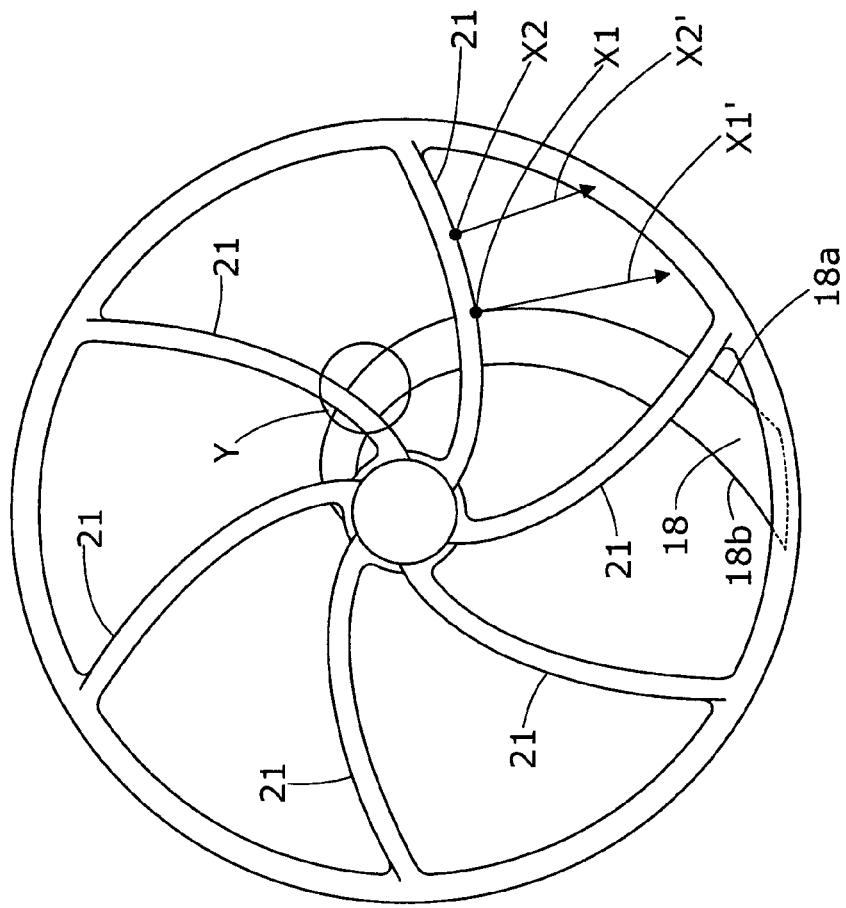
FIG. 4 is a view of optional external spiral ribs which may be fitted to the outside of the radiator screen.

In an alternative arrangement, shown in FIG. 4, the outer surface of the mesh screen 12 may be provided with generally radially extending raised ribs 21 which may also be of constant angle spiral form. These ribs contact the material on the outside of the screen which is above the blanking plate 18 and which is therefore detached from the screen and interact with this material to move the material towards the outer periphery of the screen. For example, detached material at location X1 on the leading edge 18a of the blanking plate 18 is propelled along the line X1' towards the outer periphery of the screen and material at point X2 is propelled along the line X2'. By employing ribs 21 of spiral form the ribs extend generally perpendicular to edges of the blanking plate 18 as the screen rotates and thus have a greater clearing effect on the detached material on the outside of the rotating screen. The ribs also tend to move the detached material in directions X1' and X2' etc which are aimed ahead of the leading edge 18a of the blanking plate 18 where the material can again enter the dead zone and not across the blanking plate towards the trailing edge 18b where the material could quickly exit the dead zone. This further improves the cleaning of the outer surface of the rotating screen.

Figure 5:
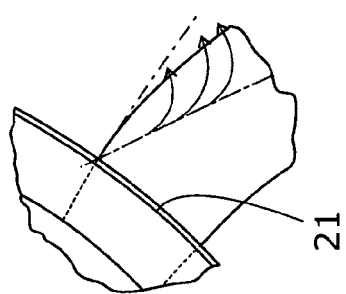
FIG. 5 is a fragmentary view of the movement of detached material in the area Y of FIG. 4.

FIG. 5 also shows how material close to the leading edge 18a of the blanking plate 18 jumps or walks along the leading edge on its way to the outer periphery of the screen as described above.

If desired, ribs 21 may extend purely radially along radii of the screen 12 but this arrangement is less efficient at clearing detached material from the screen.

In summary, there is provided a radiator screen arrangement for a combine harvester. A screen through which air, which is to pass through a radiator, is drawn by a fan. Rotating means are provided for rotating the screen. Blanking means, past which the screen is rotated, provides a blanked off area of the screen which is not subject to the induction pressure of the fan and from which particles can therefore be more easily removed. The arrangement is characterised in that the blanking means has a leading edge which is of generally spiral shape so that the particles on the outer surface of the screen which enter the blanked-off area can reach the outer periphery of the rotating screen without being exposed to the induction pressure of the fan and hence have an improved chance of being detached from the screen.

The invention claimed is:

1. A radiator screen arrangement comprising a rotating screen through which air, which is to pass through a radiator, is drawn by a fan, and a fixed plate supported adjacent an inner surface of the screen and which provides a blanked off area of the screen which is not subject to the induction pressure of the fan and from which particles can therefore be more easily removed, the fixed plate having a leading edge with respect to the direction of rotation of the screen and which edge is of generally spiral shape so that the particles on the outer surface of the screen which enter the blanked-off area can reach the outer periphery of the rotating screen without being exposed to the induction pressure of the fan and hence have an improved chance of being detached from the screen.

2. A screen arrangement according to claim 1 in which the leading edge is of constant angle spiral form.

3. A screen arrangement according to claim 1 in which the plate comprises a trailing edge of constant angle spiral form in order to minimise the area of the screen which is blanked-off.

4. A screen arrangement according to claim 1 in which the plate is provided with brushes, along its edges which seal the plate to the rotating screen to provide a reduced induction pressure on that portion of the screen currently above the plate as the screen is rotated past the fixed plate.

5. A screen arrangement according to claim 1 in which an escape shute is provided which partially overlies the plate on the outside of the rotating screen for material which passes to the outer periphery of the blanked-off area to direct this material away from the screen.

6. A screen arrangement according to claim 1 in which the outer surface of the screen is provided with generally radially extending ribs which contact material detached from the outer surface of the rotating screen and tend to move such material towards the outer periphery of the screen.

7. A screen arrangement according to claim 6 in which the radially extending ribs are also of constant angle spiral configuration.

8. A screen arrangement according to claim 1 in which the screen is rotated by a hydraulic motor.

* * * * *